(12) United States Patent
Bindana et al.

(10) Patent No.: US 11,307,817 B1
(45) Date of Patent: Apr. 19, 2022

(54) METHODS AND SYSTEMS FOR HANDLING A DOCUMENT HAVING A COMBINATION OF PAGES

(71) Applicant: XEROX CORPORATION, Norwalk, CT (US)

(72) Inventors: Srinivasarao Bindana, Kakinada (IN); John Allott Moore, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/213,134

(22) Filed: Mar. 25, 2021

(51) Int. Cl.
*G06F 3/12* (2006.01)
(52) U.S. Cl.
CPC .......... *G06F 3/1238* (2013.01); *G06F 3/1205* (2013.01); *G06F 3/1206* (2013.01); *G06F 3/1243* (2013.01)
(58) Field of Classification Search
None
See application file for complete search history.

(56) References Cited

U.S. PATENT DOCUMENTS

2002/0029277 A1* 3/2002 Simpson-Young .......................... H04L 12/2834 709/228
2003/0208691 A1* 11/2003 Smart .................... H04N 1/444 713/168

FOREIGN PATENT DOCUMENTS

KR          101377663 B1 *   7/2020

* cited by examiner

*Primary Examiner* — Lennin R RodriguezGonzalez

(57) ABSTRACT

The present disclosure discloses methods and systems for handling a document including a combination of normal pages and secure pages. The method includes receiving a print job from a user including one or more pages tagged as secure pages and the remaining pages tagged as normal pages. Based on the tagging, the normal pages are printed automatically without requiring any authentication information from the user and the secure pages are printed upon receiving an authentication information from the user. Finally, based on user's input, the printed secure pages and the printed normal pages are rearranged to have a complete ordered printed document.

31 Claims, 9 Drawing Sheets

METHODS AND SYSTEMS FOR HANDLING A DOCUMENT HAVING A COMBINATION OF PAGES

TECHNICAL FIELD

The present disclosure relates to the field of printing. More specifically, the disclosure relates to methods and systems for handling a document with a combination of pages i.e., one or more pages to be secured and normal pages.

BACKGROUND

Secure printing is a common feature in multi-function devices and/or printers these days. The secure printing feature allows a user to initiate printing of a secure print job submitted only when the user goes to the multi-function device and provides a passcode, which was set earlier by the user. In secure printing, if a user wants to print a multi-page document, e.g., a document containing 100 pages, then the entire multi-page document is processed as a single print job and the entire document is secured, which means that the user can initiate printing of the entire document only after entering the passcode at the multi-function device and the user has to wait there until the entire document is printed. This is time-consuming and may exhaust the user, especially in case of such lengthy documents.

There can be scenarios where the user only wants to secure a small portion of a multi-page document. In other words, the user wants to securely print only a few pages of the entire document. For instance, the user may wish to securely print only 5 pages in a 100-page document. Few examples where the user may wish to secure a few pages of the documents may include—government affidavits, company sales data, company contracts, or loan related documents. In such documents, only a few pages include confidential data and thus are required to be printed securely. In such scenarios, the user either submits the entire document as a single print job, i.e., as a secure print job or manually submits two different jobs, i.e., a secure print job for pages to be printed securely and a normal print job for the remaining pages. In the former scenario, the user initiates the printing of the entire document only when the user enters the preset password/passcode at the multi-function device and the user has to wait there till the entire document is printed. As discussed earlier, this could be very time-consuming and frustrating especially because the user waits at the multi-function device for the entire job to get printed. In the latter scenario, the user requires to submit two different print jobs at the multi-function device that can be printed by the multi-function device at different times. Moreover, in this scenario, the user requires to manually rearrange the pages received in an output tray of the multi-function device from the two jobs (i.e., secure print job and normal print job) to get a compiled and/or ordered printed document. For example, the user spends extra time to see how the pages are to be arranged as he does not have any information/instructions to arrange the printed pages in the same order as in the document submitted for printing. This is again time-consuming and frustrating for the user.

In view of the above, there is a need for improved systems and methods to handle a document having a combination of secure and normal pages.

SUMMARY

According to aspects illustrated herein, a method for securing one or more individual pages of a document is disclosed. In the method, a print job is received from a user, including tagging of one or more pages to be printed as secure pages and remaining pages as normal pages. The one or more secure pages and the normal pages are separated based on the tagging. Subsequently, the normal pages are printed without requiring any authentication information, and the one or more secure pages are printed upon receiving an authentication information from the user. The printed one or more secure pages and the printed normal pages are rearranged based on an input from the user, resulting in a complete printed ordered document.

According to further aspects illustrated herein, a method for handling a document including a combination of pages is disclosed. The method includes receiving a print command from a user for printing a document, where the document includes a combination of one or more pages to be secured and one or more normal pages. A user interface is provided to the user: having an option to provide an input on one or more pages to be secured and an option to provide an input on the arrangement of the one or more secure and normal pages. Subsequently, the document along with the received inputs are sent to a multi-function device for printing. Based on the received inputs, one or more secure pages and normal pages are identified from the document. The normal pages of the document are printed without requiring any authentication information till completion, while printing of the identified one or more secure pages of the document is initiated upon receiving an authentication information from the user. Thereafter, based on the input on the arrangement of the one or more secure pages and normal pages, one or more instructions are executed to rearrange the printed one or more secure pages and the normal pages to have an ordered printed document.

According to another aspect illustrated herein, a system for handling a document including a combination of pages is disclosed. The system includes a print driver running on a computing device. The print driver receives a print command from a user for printing a document, where the document includes a combination of pages to be secured and normal pages. Thereafter, a user interface is provided to the user, where the user interface includes an option to provide an input on one or more pages to be secured and an option to provide an input on the arrangement of the one or more secure pages and normal pages. Once the inputs are received, the document and the received inputs are sent for printing to a multi-function device. The multi-function device identifies the one or more secure pages and normal pages from the document, based on the received inputs. Subsequently, printing of the normal pages is initiated and printing of the identified one or more secure pages is initiated based on an authentication information from the user. Based on the input on combining the secure and normal pages, the pages are rearranged such that the combined printed pages are in order.

According to additional aspects illustrated herein, a multi-function device for securing one or more individual pages of a document is disclosed. The multi-function device receives a print job from a user including tagging of one or more pages to be printed as secure pages and remaining pages as normal pages. Based on the tagging, the multi-function device separates the one or more secure pages and the normal pages. Thereafter, the normal pages are printed without requiring any authentication information and the one or more secure pages are printed upon receiving an authentication information from the user. Subsequently, the printed one or more secure pages and the printed normal pages are rearranged based on an input from the user, resulting in a complete ordered print job.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
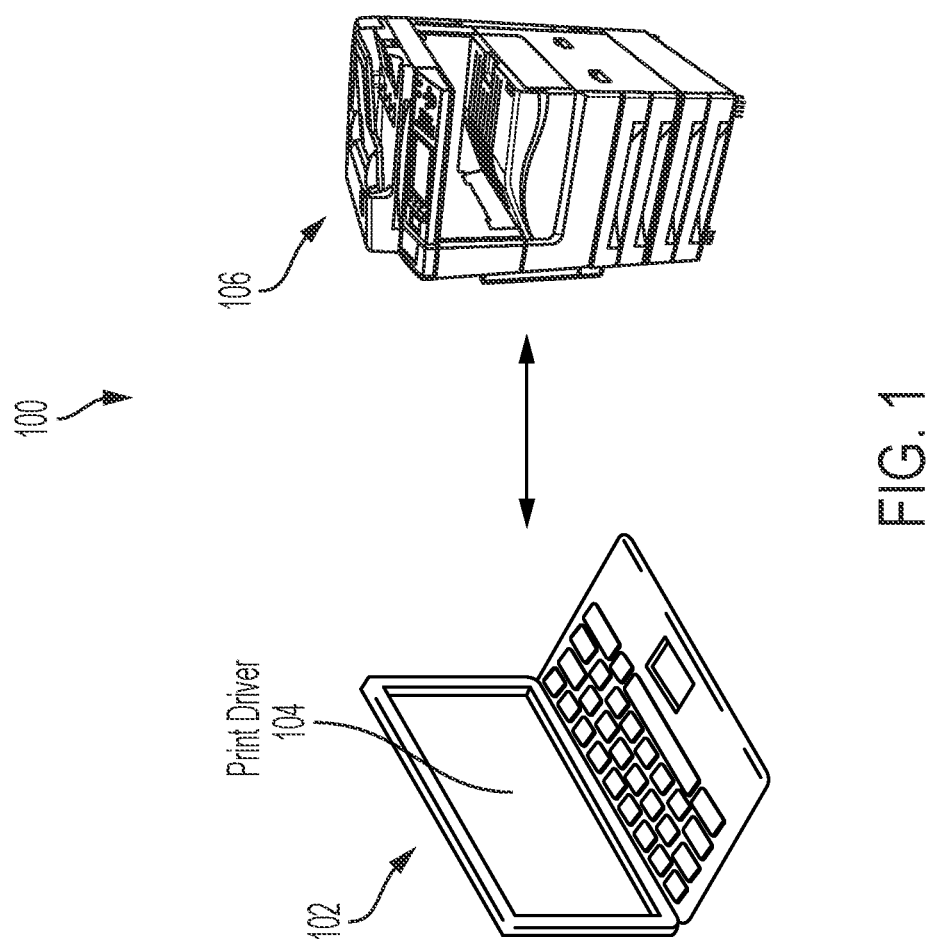
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, and so forth. The multi-function device may include software, hardware, firmware, or a combination thereof. In context of the current disclosure, the multi-function device handles printing and arrangement of a document including a combination of secure pages and normal pages. Once printed, the multi-function device rearranges or compiles the printed secure pages and printed normal pages to get a complete ordered printed job. The multi-function device allows a user to print one or more pages of the document as a secure print and the remaining pages as a normal print.

The term "document" refers to a multi-page document or file where one or more pages of the document are to be secured (also referred to as secure pages) and remaining pages as normal pages. The document can be in any suitable format such as Portable Document Format (PDF), Microsoft DOC format, Hypertext Markup Language (HTML) format, Extensible Markup Language (XML) format, Microsoft XLS format (MS-XLS), Tag Image File Format (TIFF), etc.

The "secure pages" of the document are one or more pages that are to be printed as secure print, whereas "normal pages" are the remaining pages of the document that are to be printed as normal print. In other words, the normal pages are printed/released without any authentication information from the user, whereas the secure pages can be printed only upon receiving an authentication information (e.g., a passcode) from the user. The secure pages may contain confidential data of the user or otherwise include data that the user wishes to secure.

The term "tagging" refers to marking one or more pages of the document as secure pages and remaining pages as normal pages. The tagging of document is done based on inputs received from a user. For example, the user can provide page number(s) or page range to tag one or more pages as secure pages in the document. In another example, the user can provide one or more keywords such that pages including the input keywords are tagged as secure pages, while the remaining pages are tagged as normal pages. Based on the tagging, the secure pages are submitted as secure print and the normal pages are submitted as a normal print to the multi-function device.

The term "rearranging" refers to compiling or arranging or combining the printed secure pages and the printed normal pages during/after printing to get an output/printed document in an order. In other words, rearranging means putting or arranging the normal pages and the secure pages in an order that matches the order of the original document as submitted for printing. For instance, if a document submitted for printing includes a total of 5 pages of which page number 2 and 4 are secure pages, then rearranging requires interleaving printed page numbers 2 and 4 after page numbers 1 and 3, respectively, to have the final printed document where pages 1 to 5 are arranged in sequential or ascending order. In context of the current disclosure, the rearrangement can be done using a manual method or an automated method.

The term "computing device" refers to a device that a user typically uses for giving print commands and other purposes. Examples of the computing device include, but are not limited to, a personal computer, a desktop, a laptop, a mobile phone, a tablet, a Personal Digital Assistant (PDA), a smart-phone or any other device capable of data communication. The computing device includes a print driver application that allows the user to submit print commands, one or more print parameters, and a document for printing. In context of the present disclosure, the print driver application includes an option to secure one or more pages of a document such that the secure pages are submitted as secure print job while the remaining pages are submitted as normal print at the multi-function device. Additionally, the print driver application includes an option to provide an input on the arrangement of the secure pages and normal pages during/after printing, such that arranging the printed secure and normal pages outputs an ordered printed document.

Overview

Typically, when a user wishes to print one or more pages having confidential data, he submits the document as a secure print job at a multi-function device. In such a scenario, the user is required to input a passcode to release the job at the multi-function device. This means, that the user typically waits at the multi-function device till the entire document is printed. While printing a lengthy document, the time invested by the user to print the document is huge. The present disclosure is provided to address such problems. The disclosure addresses the known problems by providing methods and systems that allow the user to user to secure one or more pages of the document instead of the entire document based on a choice of the user.

The present disclosure provides methods and systems for handling a document having a combination of secure pages and normal pages. While submitting the document for printing, a user provides an input to choose one or more pages that are to be securely printed. These pages are automatically tagged as secure pages and remaining pages are automatically tagged as normal pages. The user also selects a method to rearrange the two set of pages after/during printing. Post selection, the document is submitted at the multi-function device for printing. Upon submission, the multi-function device prints the normal pages. Here, the user is not required to go and initiate printing of the normal pages at the multi-function device. Subsequently, the user visits the multi-function device, and inputs an authentication information such as a passcode that is previously set by him to release the secure pages. Once printed, the methods and systems rearrange the printed normal and printed secure pages to have printed document in an order.

This way, the present disclosure allows the user to print the normal pages of the document beforehand and he is required to visit the multi-function device only to release the secure pages. This saves user's time and effort in printing the document. In addition, the disclosure eases the task of compiling the printed secure pages and the printed normal pages.

One example is discussed for the sake of clarity. If a user wants to print a multi-page document having 20 pages and the user only wants to print the $3^{rd}$ and $5^{th}$ pages securely, then the systems and the methods allow the user to print $3^{rd}$ and $5^{th}$ pages as secure print while printing the remaining pages, i.e., 1, 2, 4, and 6-20 as normal print. In this scenario, the user is required to reach the multi-function device only to release the secure print i.e., $3^{rd}$ and $5^{th}$ pages, while remaining pages are automatically printed when the document is submitted for printing. The methods and the systems further provide ways to re-arrange/compile the printed pages such that the printed pages/document are in the same order as that of the document submitted for printing.

Exemplary Environment

FIG. 1 shows an exemplary environment 100 in which various embodiments of the disclosure can be practiced. The environment 100 includes a computing device 102 that is communicatively coupled to a multi-function device 106. The multi-function device 106 is just one example, but the environment 100 may include a printer, a multi-function peripheral device or any device having printing capabilities. Similarly, the computing device 102 can be a laptop, a personal computer, a mobile device, a personal digital assistant or any known or later developed computing device.

A user uses the computing device 102 for his day-to-day tasks such as chatting, emailing, surfing, submitting documents for printing, or the like. In the context of the current disclosure, the user uses the computing device 102 for submitting a document having a combination of secure pages and normal pages for printing. To accomplish this, the computing device 102 runs an application such as a print driver 104. The document includes multiple pages that may or may not have page numbers. In case of no page numbers, the computing device 102 or the multi-function device 106 may assign page numbers for processing purpose. The page numbers or the sequence of the pages in the document define an order of the pages of the document.

In operation, a user submits a document for printing via the print driver 104, where the user wishes to secure one or more pages of the document and remaining pages as normal pages. The print driver 104 provides various print options for submitting the print job including, but not limited to, number of copies, print scale, orientation, number of pages, and so on. In the context of present disclosure, the print driver 104 includes an option to provide an input on one or more pages to be secured. Using this option, the user can secure one or more individual pages of the document. In other words, the option allows the user to select one or more pages of the document that are to be securely printed. Further, the print driver 104 includes another option to provide an input on the arrangement of secure and normal pages while/after printing. This option allows the user to select a method to rearrange or compile the secure pages and normal pages to get an output document arranged in an order.

Once the user provides his inputs on both the options, he submits the document for printing. The print driver 104 submits the document along with the selected inputs to the multi-function device 106. Upon submission, the multi-function device 106 receives the document along with the user selected inputs. Based on the received inputs, the multi-function device 106 first identifies the one or more secure pages and normal pages from the document. Here, the multi-function device 106 separates the one or more secure pages from the normal pages of the document. Subsequently, the multi-function device 106 initiates printing of the normal pages. Once printed, the multi-function device 106 receives an authentication information from the user to release the secure pages of the document. Upon receiving the authentication information, the multi-function device 106 initiates printing of the secure pages of the document. Thereafter, based on the option selected by the user to combine the secure and normal pages, the multi-function device 106 rearranges the two different types of job/pages to get the printed document in an order. This way, the user can print the document having a combination of secure and normal pages in a time-efficient manner and he is not required to wait till the entire document is printed. Also, the user gets the complete compiled printed document with normal pages and the secure pages in an order, which reduces his overall efforts.

Exemplary Block Diagram

Figure 2:
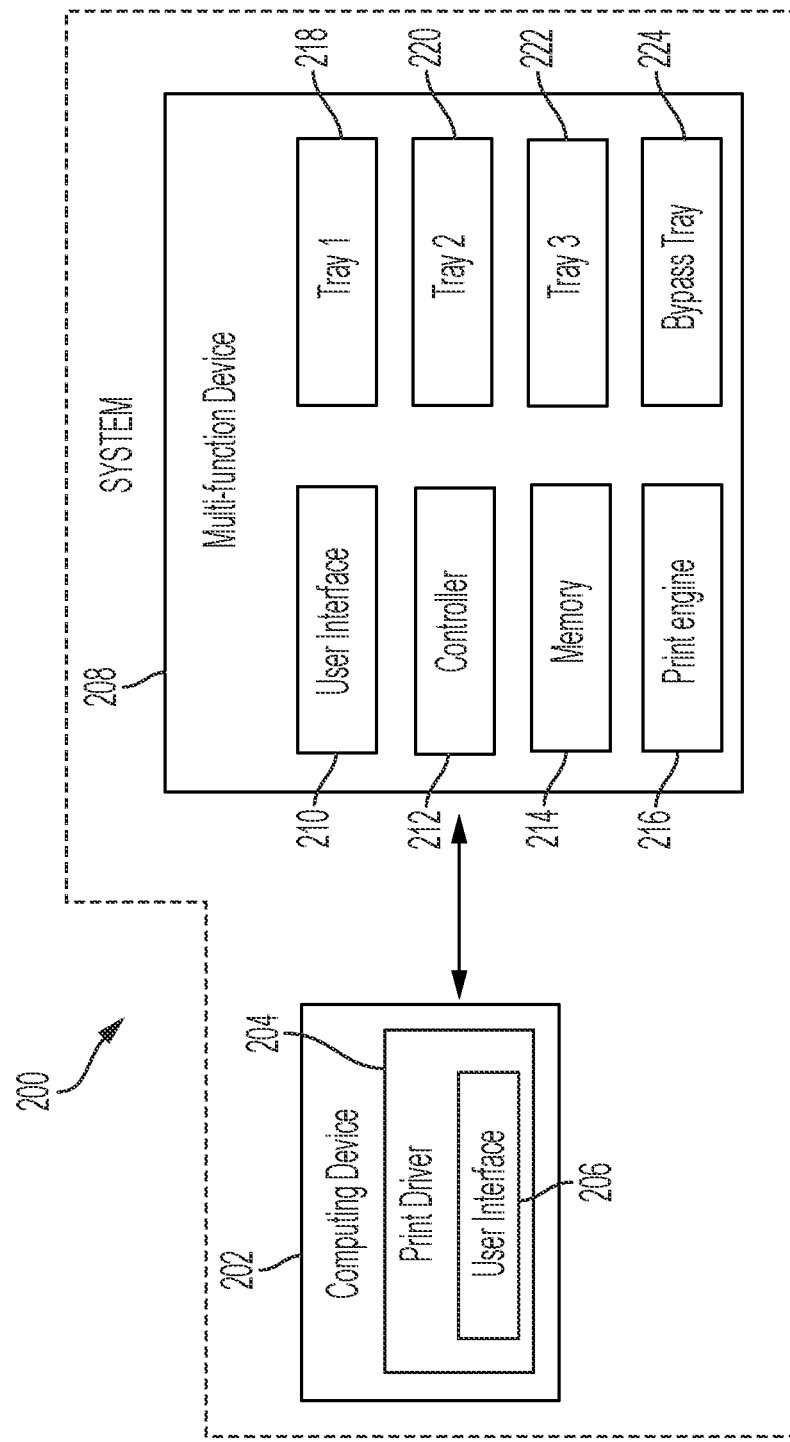
FIG. 2 is a block diagram illustrating a system and its components, in accordance with an embodiment of the present disclosure.

FIG. 2 is a block diagram illustrating various components of a system 200 including a computing device 202 and a multi-function device 208 for implementing the current disclosure. As shown, the computing device 202 includes a print driver 204 to perform various tasks such as receiving a print request for printing a document, receiving one or more print options related to the print request, and so on. The computing device 202 is communicatively coupled to the multi-function device 208 via a communication network (although not shown) to perform various tasks such as sending a document having a combination of secure and normal pages for printing, sending one or more inputs for printing the submitted document, or other tasks required to implement the current disclosure. Although not shown, the computing device 202 may include additional component(s) as required to implement the present disclosure. Also, the computing device 202 may perform functions and operations like the computing device 102 as discussed in FIG. 1.

Further, the multi-function device 208 includes a user interface 210, a controller 212, a memory 214, a print engine 216, and multiple trays including tray-1 218, tray-2 220, tray-3 222, and a bypass tray 224. The multi-function device 208 may include additional component(s) as required to implement the present disclosure. Also, the multi-function device 208 may perform functions and operations similar to the multi-function device 106 discussed in FIG. 1.

In operation, a user uses the computing device 202 to submit a document for printing at the multi-function device 208. Upon submitting a print command, the print driver 204 running on the computing device 202 displays a user interface 206. The user interface 206 includes a number of print options for user's selection such as number of copies, print scale, orientation, number of pages, and so on. Along with these conventional print options, the user interface 206 includes an option to securely print one or more pages of the document. The option allows the user to provide an input based on which one or more pages of the document to be secured are tagged as secure pages and the remaining pages are tagged as normal pages. This option is particularly useful in a scenario where one or more pages of the document include confidential information and the user wishes to print only these pages as secure print, while he wants to print the remaining pages as normal print. For instance, if a user wishes to print a 50 pages document, of which only 5 pages include confidential information, the user can select the provided option. By selecting the option, the user saves his time as he can release the remaining 45 pages as normal print and is only required to initiate release of the 5 secure pages once the 45 normal pages are printed at the multi-function device 208.

Figure 5A:
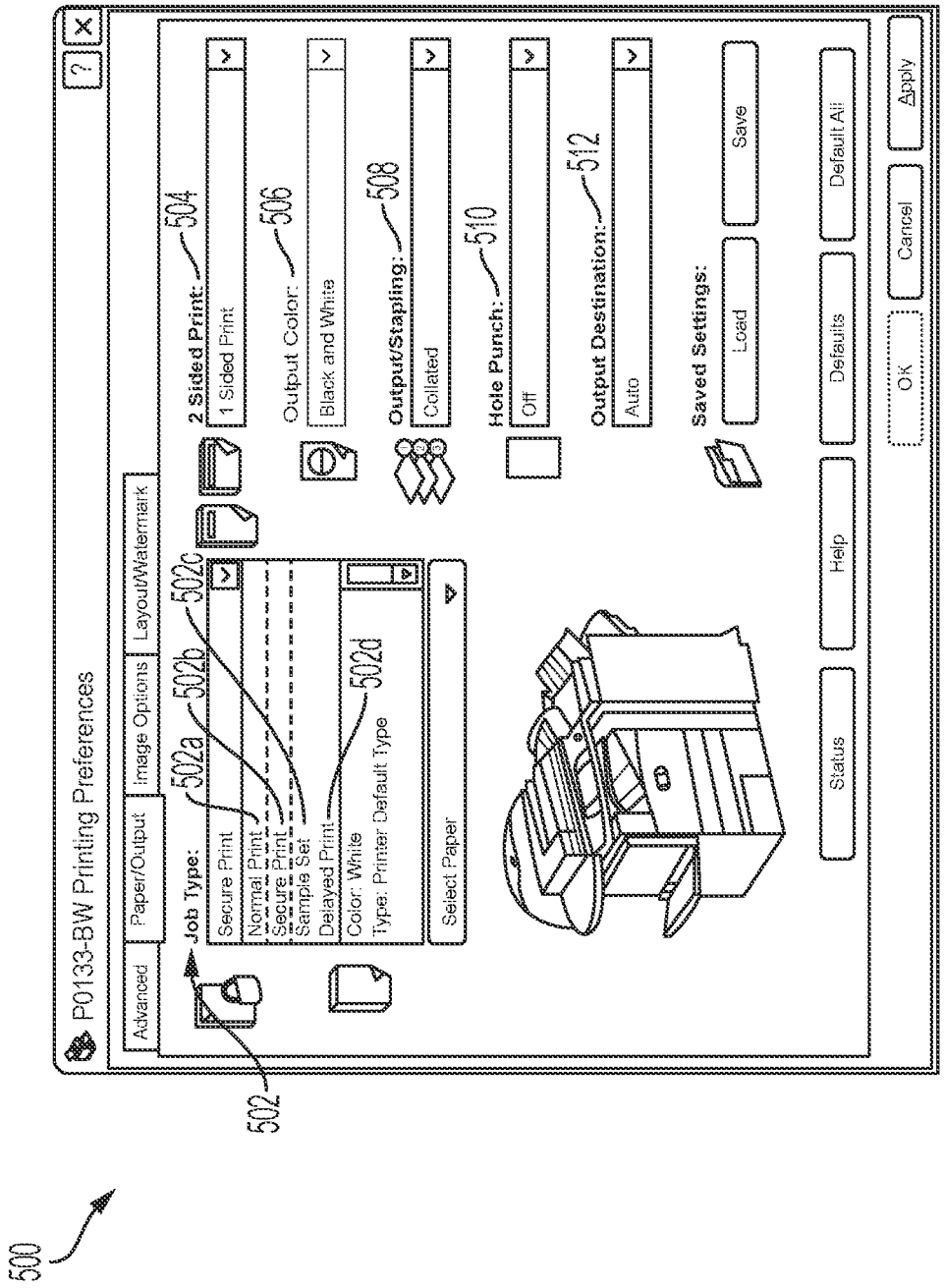
FIGS. 5A-5E show exemplary snapshots of user interfaces provided on a computing device and/or a multi-function device, in accordance with embodiments of the present disclosure.
Figure 5B:
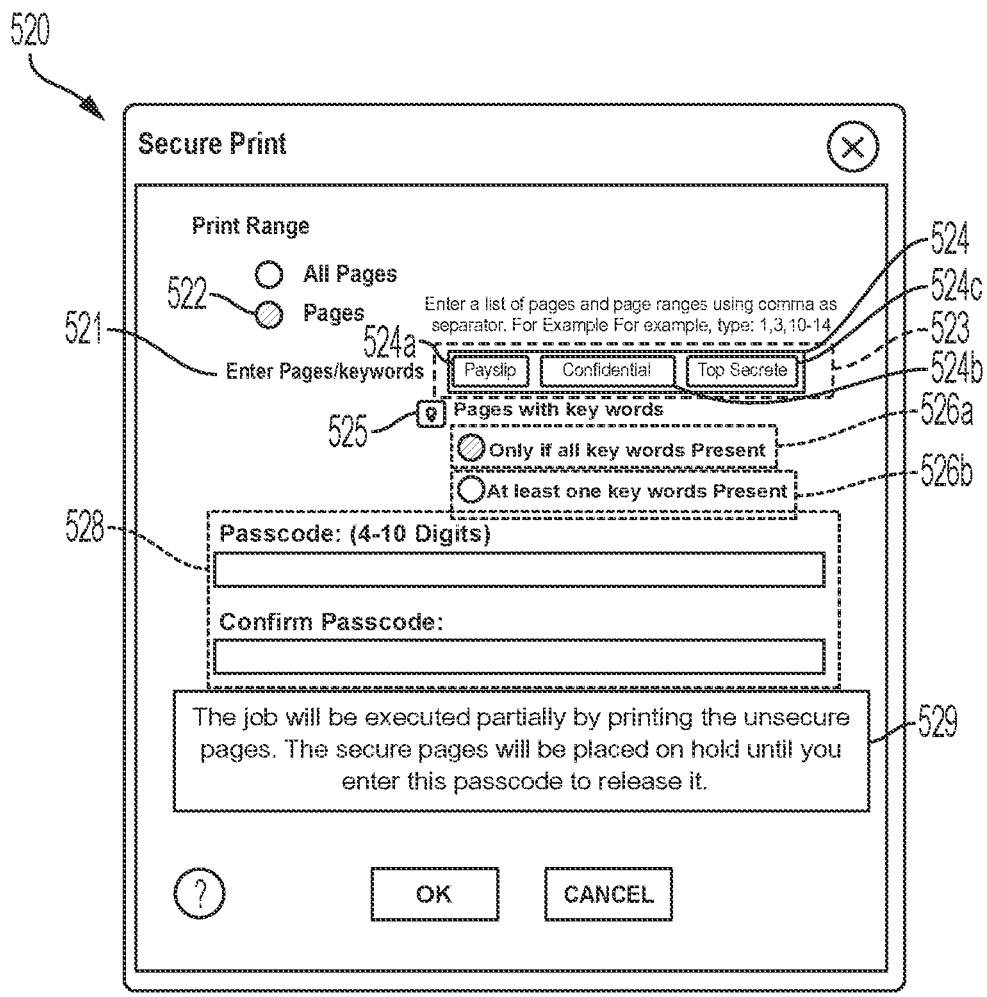

One exemplary user interface 500 including various print options is shown in FIG. 5A. As shown, the user interface 500 provides several print options including job type 502, 2-sided print 504, output color 506, output/stapling 508, hole punch 510, output destination 512, and so on. The user selects one or more options of his choice for submitting a print job. Here, the user wishes to securely print a document, so he selects a sub-option secure print 502*b* under the option job type 502. Other available sub-options under job type 502 option are normal print 502*a*, sample set 502*c*, and delayed print 502*d*. Upon selecting the sub-option secure print 502*b*, another user interface 520 is presented to the user (as shown in FIG. 5B). The user interface 520 provides an option (marked as 521) to select one or more pages of the document that are to be securely printed. Selecting the option 521 allows the user to provide his input via the user interface 520 such that based on his input one or more pages of the document are tagged as secure pages. The input provided by the user may include one or more of the following—page numbers, page range, keywords, and so on. The user clicks on 'pages' (marked as 522) to provide his input on one or more pages that are to be secured. Upon clicking the option, pages 522, the user is required to enter his inputs in a corresponding box 523. The user can enter page numbers, page ranges, or keywords in the box 523 to secure one or more pages of the document. As shown here, the user provides his inputs in the form of a list of keywords 524 such as 'Payslip' 524*a*, 'Confidential' 524*b*, and 'Top secrete' 524*c*. The user also selects a checkbox (marked as 525), where clicking on the checkbox indicates that one or more pages including the provided keywords are to be tagged as secure pages and the remaining pages are to be tagged as normal pages. The user can further select one of the two sub-options (marked as 526*a* and 526*b*) to either—a) tag pages as secure pages having all the provided keywords or b) tag pages as secure pages having at least one of the mentioned keywords, respectively. The user interface 520 also provides an option to set a passcode 528 that can be used by the user to print the secure pages later. The user interface 520 further displays a message (marked as 529) indicating that the job is to be executed partially by printing the normal pages without requiring any authentication information and the secure pages to be printed only upon receiving the authentication information i.e., the passcode as set by the user.

In the above example, the user provides his inputs in the form of keywords to secure one or more pages of the document. But the user may provide his input in the form of page numbers and page ranges to secure one or more pages of the document. For example, the user may input 1, 3, 7 to secure $1^{st}$, $3^{rd}$ and $7^{th}$ pages of a 10-page document. In another example, the user may input "2-5" to collectively secure $2^{nd}$, $3^{rd}$, $4^{th}$, and $5^{th}$ pages of the document. In addition to the page numbers, page range and keywords, the user interface 206 may provide additional options that can be selected to secure one or more pages of the document. For example, the user interface 206 may provide an option 'watermark' to secure pages in the document. Other input options that can be provided by the user to secure one or more pages may include a pre-defined image, etc.

Once the user provides his input to secure one or more pages of the document, the print driver 204 searches in the document to identify one or more pages including the provided inputs. Based on the presence of the provided inputs, the one or more pages of the document are tagged by the print driver 204 as secure pages. The print driver 204 tags the remaining pages as normal pages. While not shown, the user interface 206 allows the user to provide more than one type of input to tag the secure pages. For instance, a user can select a page range 1-5 in combination with a keyword 'confidential' to tag pages as secure pages. In this case, the print driver 204 only searches the first 5 pages of the document for the provided keyword and tags the pages including 'confidential' as secure pages.

In the above examples, the tagging of one or more pages as secure pages is done by the print driver 204, however, there can be scenarios where the tagging is done by the multi-function device 208. To accomplish this, the user input(s) along with the document is submitted to the multi-function device 208 for printing and the controller 212 searches the provided input(s) in the document. Upon searching, the controller 212 tags the pages identified with the provided input(s) as secure pages and the remaining pages as normal pages. This way, the one or more pages can be automatically tagged as secure pages based on an input from the user.

In addition to the option of securing one or more pages of the document, the system 200 provides another option that allows the user to provide his input on the rearrangement of the one or more secure and normal pages after printing. The input provided by the user on the rearrangement of the one or more secure and normal pages allows compilation of the printed secure pages and printed normal pages to get the printed document in order. Here, the order of the printed secure and normal pages after rearrangement matches with the order of the original document that is submitted for printing. For instance, if a user wishes to submit a 20 pages document for printing such that page numbers 2 and 4 of the document are tagged as secure print, rearrangement/compilation of the secure pages with the normal pages requires placing the printed secure page number 2 between the printed page numbers 1 and 3 and placing the printed secure page number 4 between the page numbers 3 and 5. Therefore, the rearrangement option provides an output document where the printed normal and secure pages are arranged in a sequential order that is similar to the order of the pages in the document submitted for printing.

Figure 5C:
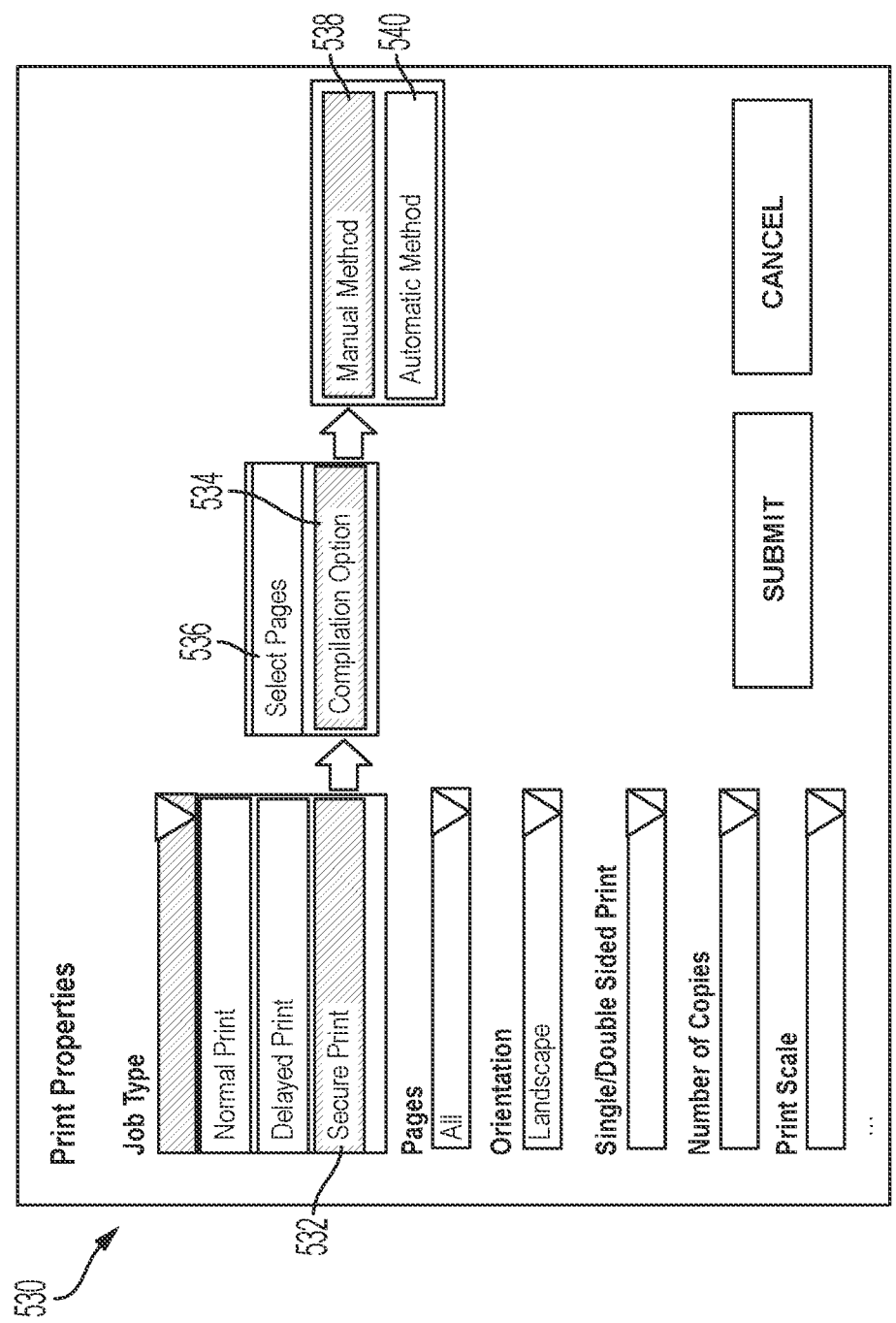

The rearrangement of the one or more secure pages and the normal pages can be done using a manual method or an automated method. To that end, the rearrangement option presented via the user interface 206 includes two sub-options—manual method and automated method, for selection by the user. One exemplary user interface 530 providing the two methods as rearrangement options is shown in FIG. 5C. As shown, the user interface 530 provides an option to secure one or more pages of the document (marked as 'Secure Print' 532) and a compilation option 534. Considering the user already selected the pages to be secured (for example via option 536), he clicks the compilation option 534. Upon clicking the compilation option 534, the user interface 530 presents a manual method 538 and an automatic method 540 for user's selection. The user can select the method of his choice. Here, the user selects the manual method 538 to compile the document after printing.

Once the user provides his inputs to secure one or more pages and compilation of normal and secure pages, he submits the document along with the selected inputs for printing at the multi-function device 208.

Upon receiving the document along with user's inputs, the controller 212 initiates processing of the received inputs along with the document. In one scenario, if the inputs indicate that the user has selected a manual method to secure one or more pages of a document, the controller 212 communicates the print engine 216 to—a) initiate printing of the pages tagged as normal pages, and b) print one or more pre-defined labelled separator sheets along with the printed normal pages. For instance, if the user requested to manually compile a 10 pages document having page number 2 and 4 tagged as secure pages and remaining pages (i.e., pages 1, 3, and 5-10) tagged as normal pages, the controller 212 communicates the print engine 216 to print the normal pages (1, 3, and 5-10) having pre-defined labelled separator sheets inserted in place of page numbers 2 and 4 (i.e., in place of secure pages). Each pre-defined labelled separator sheet can be a sheet including a printed message indicating to replace the separator sheet with one or more printed secure pages. In other words, the pre-labelled separator sheets are placed between the printed normal pages and are later on replaced with the printed one or more secure pages. For instance, if the document having 10 pages include 1-8 normal pages and 9-10 secure pages, the normal pages are printed with a pre-labelled separated sheet placed after the $8^{th}$ page, where the separator sheet may include a message "Replace with secure page numbers 9 and 10". The pre-defined labelled separator sheet can be a colored page, a page having an image/mark, and so on.

Figure 5D:
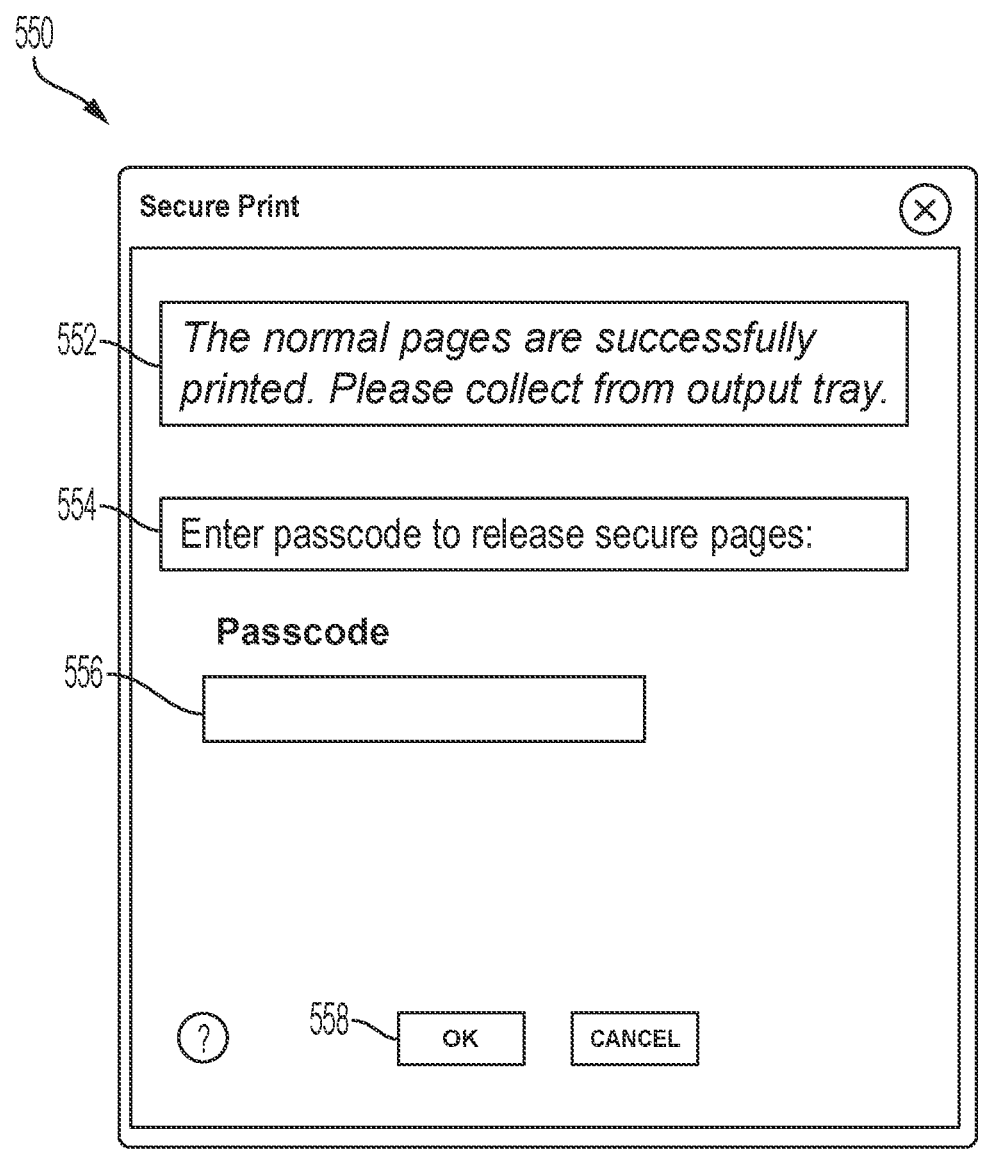

Once normal pages are printed or released, the user is requested via the user interface 210 to enter a passcode to release the one or more secure pages. One exemplary user interface 550 presented to the user after printing of normal pages is shown in FIG. 5D. As shown, the user interface 550 presents a message (marked as 552) to let the user know that the normal pages are printed, and he can collect the printed normal pages from an output tray. The user interface 550 also displays a message (marked as 554) requesting the user to enter a passcode to release the one or more secure pages. The user enters the passcode in a box 556 and submits his request by clicking on 'Ok' (marked as 558) to initiate printing of the one or more secure pages.

In the above example, once the passcode is received by the controller 212, the print engine 216 releases the secure pages such that the secure pages 2 and 4 are printed with matching instruction. The matching instructions can be provided on one or more blank sheets, where the instructions may include a message to let the user know where the printed secure pages are to be inserted between the printed normal pages. Referring back to the same example, where a document with 10 pages has 1 to 8 pages printed as normal pages and page numbers 9 and 10 are printed as secure pages. As the user enters the passcode, the secure pages (i.e., page numbers $9^{th}$ and $10^{th}$) are released along with a sheet including matching instructions. Here, the first sheet that is printed can be the matching instructions sheet followed by printed secure pages $9^{th}$ and $10^{th}$. The matching instructions sheet may include a message same as that of the pre-labelled separators sheet i.e., "Replace with secure page numbers 9 and 10" as that of the separator. This allows the user to match the pre-labelled separator sheet with the matching instructions sheet to place the securely printed page numbers 9 and 10 after page number 8.

This way, the user uses the manual method to rearrange the printed secure pages and normal pages to get an output printed document in an order. The pre-labelled separator sheet and the matching instructions sheet discussed herein may be in any suitable format without departing from the scope of the current disclosure. For example, the pre-labelled separator sheet and the matching instructions sheet can be of same color, and so on.

Figure 5E:
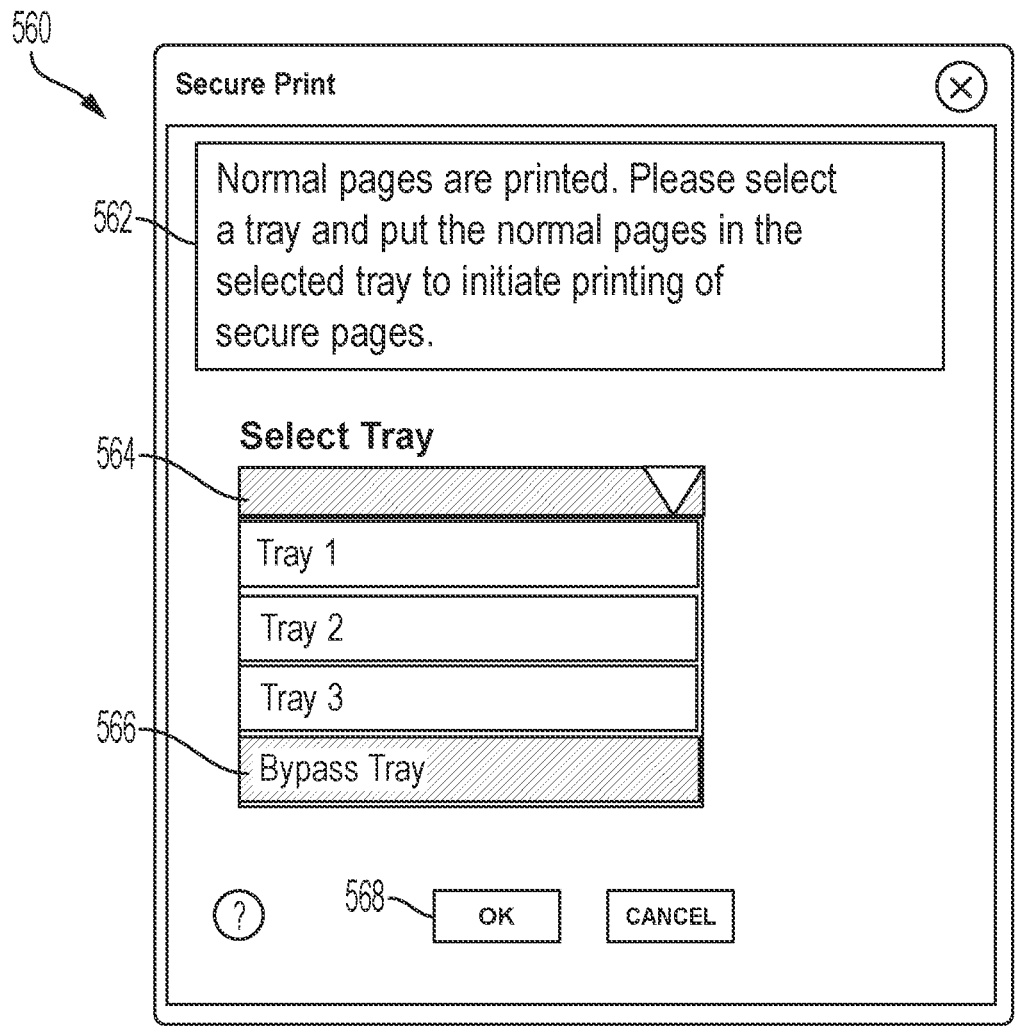

In another scenario, if the inputs received by the controller 212 indicates that the user has selected the automatic method to rearrange/compile the one or more secure and normal pages, the controller 212 requests the print engine 216 to initiate printing of the normal pages. Once the normal pages are printed, the controller 212 provides a message to the user via the user interface 210 to place the already printed normal pages in a pre-defined tray (e.g., tray-1 218, tray-2, 220, tray-3 222, or the bypass tray 224). The user selects the tray of his choice and places the printed normal pages in the selected tray. One exemplary user interface presenting a message for selection of a pre-defined tray is shown in FIG. 5E. Here, the user interface 560 displays a message (marked as 562) to let the user know that the normal pages are printed and asks him to select a tray and put the printed normal pages in the selected tray to initiate printing of secure pages. The user interface 560 provides an option 'Select Tray' 564 to select a tray. Here, the user selects a bypass tray (marked as 566) and submits his request by clicking on 'OK' 568.

Once submitted, the controller 212 requests the user to provide authentication information for releasing the secure pages via the user interface 210. Upon receiving the request, the user enters the authentication information such as a pre-set passcode via the user interface 210. Subsequently, the controller 212 communicates the print engine 216 to initiate printing of the secure pages. Here, the secure pages are printed in a manner such that the one or more secure and normal pages are interleaved to yield a complete ordered printed document in an output tray. To accomplish this, the controller 212 passes the normal pages through a printer path without printing anything, and the secure pages are printed and placed in between the normal pages to get a printed document in an order. For the sake of clarity, an example is discussed. If page numbers 2 and 8 of a 10-page document are to be printed securely, the controller 212 picks the printed normal pages from the pre-defined tray, say tray 222, the controller 212 passes the printed normal page through the printer path without printing anything, followed by printing the secure page number 2. Subsequently, the printed normal pages 3-7 are passed through the printer path without printing anything on these pages, and page 8 is printed and output in the output tray. Finally, page numbers 9 and 10 are passed through the printer path without printing anything. This way, the final printed document is obtained in the output tray including page numbers 1 to 10 arranged in a sequential order.

From the above discussed examples, it can be considered that the manual compilation option is advantageous in scenarios where the user can easily perform the compilation, e.g., when number of secure pages to be interleaved between the normal pages are less, when secure pages are to be inserted at a single location in the normal pages, i.e., all the secure pages are required to be positioned at the beginning, at the end, or between two normal pages. The automatic compilation is advantageous in scenarios where manual compilation is difficult or time consuming for the user, e.g., when the number of secure pages is more and/or the secure pages are to be positioned after a frequent interval between the normal pages.

The system 200 facilitates a feature of secure printing of one or more pages of a document along with normal printing of pages of the same document. This is achieved by—i) allowing the user to submit inputs on one or more pages to be considered as secure pages and remaining pages as normal pages, ii) The multi-function device 208/print driver 204 automatically marks the pages as secure pages and normal pages based on the input from the user, iii) the multi-function device 208 prints the normal pages without any authentication information and prints the secure pages of the document only based on authentication information from the user and iv) automatically compiles the printed normal pages and printed secure pages based on an input from the user in the same order as of the document submitted for printing. The system 200 offers a feature of partially secure printing of the document.

Exemplary Method Flowcharts

Figure 3:
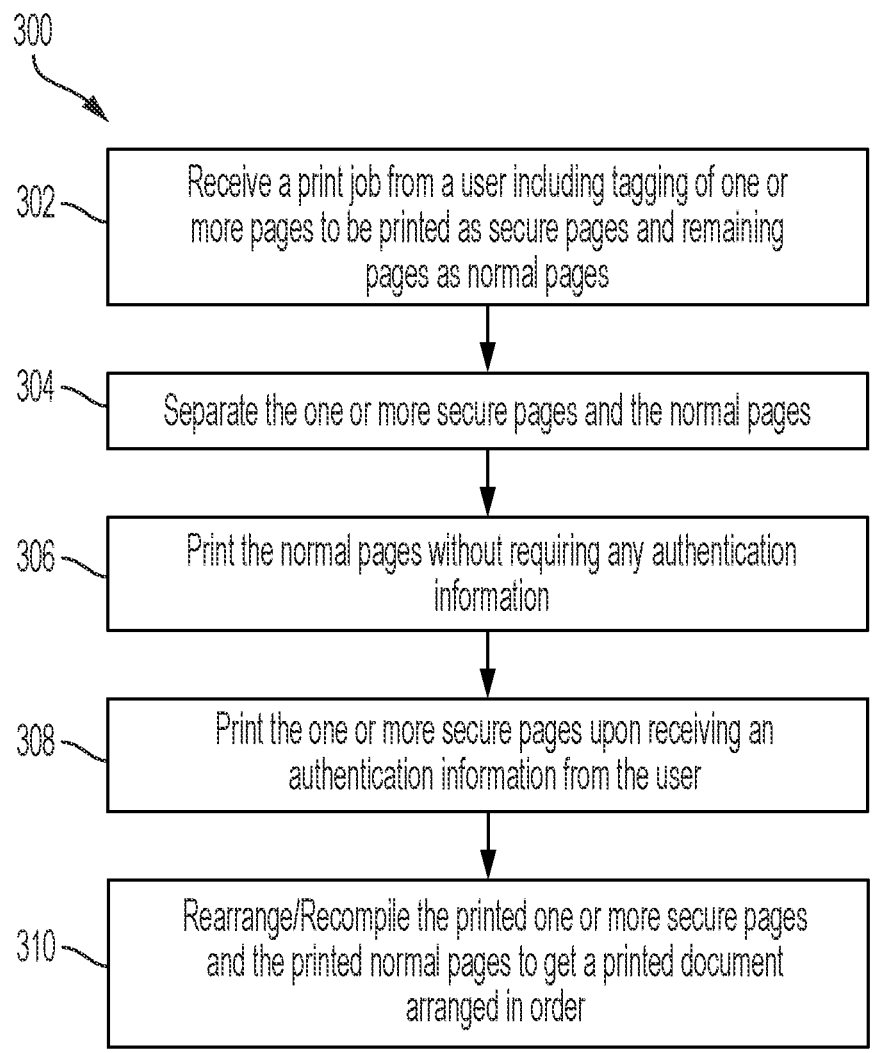
FIG. 3 is a method flowchart for handling a document having a combination of secure and normal pages, in accordance with an embodiment of the present disclosure.

FIG. 3 is an exemplary method flowchart 300 for securing one or more individual pages of a document. The method 300 is implemented using a system including a computing device and a multi-function device, such as the system 200 of FIG. 2. However, the method 300 can also be implemented using a multi-function device, such as the multi-function device 106 of FIG. 1, or the multi-function device 208 of FIG. 2.

The method 300 begins when a user wishes to print a document having one or more pages including confidential information such that the user wishes to print these pages as secure print and the remaining pages of the document as normal print. The disclosed method 300 allows the user to submit the document as a single print job such that the pages having confidential information are printed securely, and the remaining pages are printed as normal print. To submit the document, the user provides a print command via his computing device. Subsequently, the user provides his input to tag one or more pages of the document as secure pages. The user provides his input via a print driver pre-installed on the computing device of the user. Exemplary input provided by the user to tag the pages as secure pages include—page number, page range, and keywords, and so on, either in combination or alone. If the user enters page numbers/page range, the corresponding pages of the document are tagged as secure pages. This is a manual approach of tagging the pages, as the user himself identifies the pages that are to be tagged as secure pages. If the user enters one or more keywords, the keywords are searched and the pages including the keywords are automatically tagged as secure pages. This is an automated approach of tagging the pages as secure pages, as the user is not required to identify the page numbers and the print driver searches for the pages including the entered keywords and automatically tags the identified pages as secure pages. Once the tagging of secure pages is done, the remaining pages are automatically tagged as normal pages. Subsequently, the user provides his inputs on rearrangement or compilation of the secure and normal pages during/after printing. Details of the input on rearrangement of pages is discussed in detail below. Once the user provides his inputs, the user submits the document/print job at the multi-function device.

At 302, the print job is received at the multi-function device having one or more pages tagged as secure pages and the remaining pages tagged as normal pages.

Subsequently, at 304, the one or more secure pages and the normal pages are segregated/separated based on the tagging.

Once the segregation is done, printing of the normal pages is initiated at 306. The printing of the normal pages is initiated without requiring any authentication information from the user. While the normal pages are getting printed, the secure pages may be stored in the memory of the multi-function device such as the memory 214 of multi-function device 208. Further, the user receives a notification once the normal pages are printed such that the user can proceed with the printing of the secure pages. The notification can be received in the form of a text message, email, or the like.

Subsequently, at 308, the one or more secure pages are printed based on an authentication information from the user. To that end, the user first enters an authentication information such as a passcode that is earlier set by the user. Upon receiving the authentication information, the multi-function device proceeds based on the input provided by the user on rearrangement or compilation of the secure and normal pages. For instance, if the user has selected an automated method to rearrange/compile the normal and secure pages during printing, a message is displayed via the user interface asking the user to collect the printed normal pages from an output tray. Subsequently, the user is asked to select a pre-defined tray where the printed normal pages are to be placed. The user selects the tray and places the printed normal pages in the selected tray to initiate the printing of the secure pages. In case the user has selected a manual method to rearrange/compile the normal and secure pages, the one or more pre-defined labelled separator sheets are printed along with the normal pages at 306. In other words, the normal pages are released with the separator sheets such that once the secure pages are released, the user is required to replace the separator sheets with the secure pages. Here, the secure pages are printed with matching instructions or matching separators that allows the user to identify where the secure pages are to be manually placed/inserted in between the printed normal pages. In the manual approach of rearrangement/compilation, the user is required to replace the pre-defined labelled separator sheets in the printed normal pages with the printed secure pages based on the matching instructions. This way, the secure pages are printed at 308 based on the input provided by the user on rearrangement of the secure pages and the normal pages.

Subsequently, at 310, the printed normal pages and the printed secure pages are rearranged or compiled to get a complete printed document in an order. The rearrangement/compilation facilitates reordering of the printed normal pages with the printed secure pages to get the printed document in a sequential order. This compilation is done based on the selected compilation method by the user. The multi-function device executes one or more instructions to rearrange the printed normal pages and the printed secure pages. The instructions may be placing the pre-defined separator sheets, matching instructions with the printed secure pages or the like.

For instance, if the user selects the automatic compilation method, the printed secure pages are automatically interleaved between the already printed normal pages to yield a complete and properly ordered document in the output tray. In this method 300, the multi-function device automatically picks the printed normal pages from the selected pre-defined tray and passes the normal pages through a printer path without printing and are directly output in an output tray. And the normal pages are picked up and inserted into one or more secure pages to get an ordered printed document in the output tray.

In case the user selects the manual method for rearrangement/compilation, the printed secure pages are manually inserted in between the printed normal pages based on the pre-labelled separator sheets and the matching instructions, as discussed above.

Figure 4:
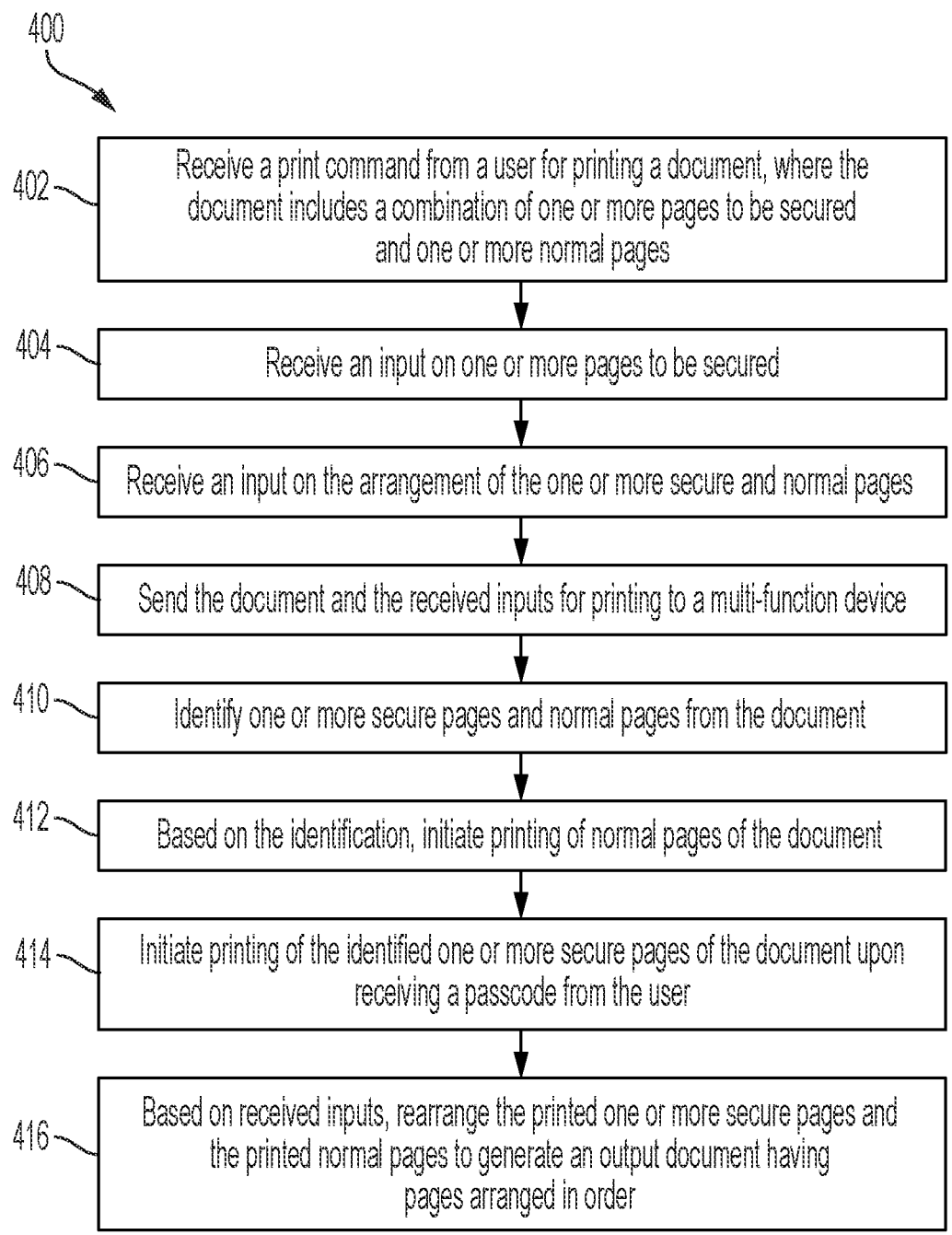
FIG. 4 is another method flowchart for handling a document having a combination of secure and normal pages, in accordance with an embodiment of the present disclosure.

FIG. 4 is another method flowchart 400 for handling a document having a combination of pages, where one or more pages are to be printed securely and one or more pages are normal pages. The method 400 can be implemented using a multi-function device, such as the multi-function device 106 of FIG. 1, or the multi-function device 208 of FIG. 2. However, the method 400 can be implemented using any equivalent device with secure printing, partial secure printing functionalities, and so on. The method 400 can also be implemented using a system including a computing device and a multi-function device, such as the system 200 of FIG. 2. For the sake of clarity, the method 400 is implemented using a system such as the system 200 of FIG. 2.

The method 400 is implemented to handle a document having a combination of pages. In other words, the method 400 is used by a user who wishes to print a document having a combination of one or more pages to be secured and one or more normal pages. At 402, a print command is received from a user to print the document having one or more pages to be secured. Upon receiving the print command, the user is provided with an option via a user interface to provide his input to secure one or more pages of the document. The user provides his input in one of the following forms—page numbers, page range, keywords, and so on. Once the input to secure one or more pages of the document is received at 404, the user is provided with another option to provide his input on the arrangement/compilation of one or more secure and normal pages. The user selects one of a manual method or an automated method to rearrange/compile the normal and secure pages. At 406, the input on arranging the normal and secure pages is received. Subsequently, the document and the received inputs are sent to a multi-function device for printing at 408.

Upon receiving the document and inputs, at 410, one or more secure pages and normal pages are identified by the multi-function device. At this stage, the input provided to secure the one or more pages is processed to identify what all pages are required to be secured. For instance, if a user has selected page numbers 2 and 4 as input to secure pages, the multi-function device tags the pages 2 and 4 as secure pages and tags the remaining pages of the document as normal pages. Based on the tagging, the secure pages are segregated from the normal pages. In comparison to method 300, in the method 400 tagging of secure and normal pages is done by the multi-function device based on the inputs received from the user.

Based on the identification of secure and normal pages, printing of pages identified as normal pages is initiated at 412. For example, for a 5-page document, if it is identified that 2nd and 4th pages are required to be printed securely, then the normal pages, i.e., 1, 3, and 5 are printed. The normal pages are printed in accordance with the input provided by the user to compile/rearrange the secure and normal pages. For instance, if the user has selected an automated method for compilation, the normal pages are printed in an output tray. For manual compilation method, the normal pages are printed with pre-defined labelled separators printed in place of identified secure pages. For instance, for a 10-page document, if 2-3 are identified as secure pages, then the normal pages are printed with a single separator placed in between page numbers 1 and 4. Once the normal pages are printed, the user is notified via a pop-up message, a text message, an e-mail, etc., that he can initiate printing of the secure pages.

Subsequently, the user initiates printing of the secure pages. To accomplish this, the user authenticates himself by entering an authentication information (e.g., a passcode) via a user interface. The user provides the authentication information to initiate printing of the secure pages. Upon providing the authentication information, printing of secure pages is initiated at the multi-function device at 414. When the user initiates printing of the secure pages, he also receives a pop-up window via the user interface, where the window is displayed based on the previously selected compilation method. For example, if the user has selected manual compilation method, the pop-up window displays a message that the normal pages are printed and are available in the output tray. In case the user has selected the automated compilation method, the pop-up window allows the user to select a tray and asks the user to place the printed normal pages in a pre-selected tray to begin printing of the secure pages.

Once the user places the printed normal pages in the selected input tray and confirms the same, at 416, the secure pages are released such that the secure pages are properly interleaved between the normal pages to get an output document arranged in an order.

One example of implementing the above-described method is discussed for the sake of clarity. The example includes a document having 10 pages such that $3^{rd}$ and $6^{th}$ pages are to be printed securely. As a result, pages 1-2, 4-5, 7-10 are normal pages that are to be printed as a normal print. Once the document is received at the multi-function device, the normal pages are printed and output in the output tray. In this case, the user has selected the automatic compilation method to compile the normal and secure pages. Once the normal pages are printed, the user selects bypass tray as the pre-defined tray, places the printed normal pages in the bypass tray, and provide authentication information to initiate printing of secure pages. The printing of secure pages begins such that the first the normal page number 1 and 2 are picked from the bypass tray and released in the output tray without printing. Here, the page numbers 1 and 2 are passed through a printer path without printing anything on them. Then, the secure page 3 is printed and placed next to page number 2 in the output tray. Subsequently, the normal pages 4 and 5 pages are picked up from the bypass tray, passed through the printer path, and released in the output tray without printing. Further, the secure page 6 is printed and placed next to page number 5 in the output tray.

Subsequently, the remaining pages 7-10 are picked up from the bypass tray, passed through the printer path without printing into the output tray. Finally, the user collects the printed document from the output tray having the secure and normal pages interleaved properly. This way, the user gets a final printed document arranged in an order.

The disclosure is explained where normal pages are printed first, and secure pages are printed upon authentication information of the user. But any suitable variations to these can be made without limiting or deviating the scope of disclosure.

The present disclosure discloses methods and systems for printing partial pages of a document as secure print that saves time earlier invested by a user in printing the entire document as a secure print. In other words, the disclosure allows a user to secure individual pages of a document rather than securing the complete document while printing. This in turn saves user's time as he is not required to wait at the multi-function device till the entire document is released. The methods and systems provide an automatic compilation to arrange the normal pages and secure pages of the printed document. This saves user's time, as the user is not required to manually identify and put the printed pages to get the final printed document. The methods and systems also provide a manual compilation option, which is particularly useful in case of small document and/or where the secure pages can be simply put next to normal pages to get the printed document in order. The methods and systems provide a simple and a reliable approach and further saves time/effort of the user in printing and compiling the documents.

The disclosure is explained with respect to scenarios, where secure pages and normal pages are printed on single side of a media sheet such as A4 sheet. But there can be scenarios where the user may wish to print on both sides of a media. In such cases, the user selects a print parameter double-sided from the print driver and submits a document for printing along with selection of secure pages and normal pages. One example is discussed for better clarity.

In this example, the user submits a document having 10 pages, where the user wishes to securely print page numbers 3 and 5 and selects an option to print on both sides. Here, the user selects automatic compilation method. Upon selection, the user submits the document for printing and compilation at a multi-function device. As discussed above, the multi-function device first prints the normal pages i.e., page numbers 1,2,4, 6-10 such that page 1 and 2 are printed on both sides of a single sheet (printed sheet 1) page 4 is printed on one side of a sheet and another side is left blank for later printing secure page 3 on the same sheet (printed sheet 2), page 6 is printed on one side of a sheet and another side is left blank for later printing secure page 5 on the same sheet (printed sheet 3), pages 7 and 8 are printed on both sides of a sheet (printed sheet 4), pages 9 and 10 are further printed on both sides of a sheet (printed sheet 5). This way, the normal pages are printed. To further print secure pages, the user first puts all printed pages in a pre-defined tray and inputs a preset passcode to initiate printing of the secure pages. Here, the multi-function device picks printed sheet 1 from the pre-defined tray and passes it through a printer path without printing and outputs in an output tray. The multi-function device then picks printed sheet 2 and identifies that page 3 requires to be printed on one side i.e., blank side of the printed sheet 2 and prints content of page 3 on the blank side. The multi-function device similarly picks printed sheet 3 and identifies that page 5 needs to be printed on one side i.e., blank side of the printed sheet 3 and prints content of page 5 on the blank side of the printed sheet 3. The multi-function device further picks printed sheet 4 and identifies that content of pages 7 and 8 is already printed and simply passes it through the printer path without printing. The multi-function device picks printed sheet 5 and identifies that content of pages 9 and 10 is already printed and simply passes it through the printer path without printing. This way, the multi-function device prints secure pages and normal pages.

In the above example, the user may select manual compilation method along with the option to print on both sides. In such scenario, when the user submits the document having 10 pages and selects the option to securely print page numbers 3 and 5 and remaining pages as normal pages. The multi-function device automatically tags page numbers 4 and 6 as secure pages along with the page numbers 3 and 5 as page 4 content is to be printed on the same sheet on which content of page 3 is to be printed and page 6 content is to be printed on the same sheet on which content of page 5 is to be printed. As a result, the multi-function device first prints page numbers 1-2, 7-10 as normal print such that pages 1 and 2 are printed on both sides of a first sheet (printed sheet 1). Then, the multi-function device prints a pre-defined labelled separator sheet (printed sheet 2) in place of page numbers 3-6. The pre-defined labelled separator sheet can be a colored page, a page having an image/mark, and so on. In this example, the pre-defined labelled separator sheet includes a sheet having a message 'INSERT PAGES 3-6 HERE'. Thereafter, the multi-function device prints pages 7 and 8 on both sides of another sheet (printed sheet 3), and page 9 and 10 are printed on both sides of another sheet (printed sheet 4). This way, the normal pages are printed along with the pre-defined labelled separator. Once the normal pages are printed, the user collects the printed sheets from an output tray. Subsequently, the user initiates printing of secure pages 3-6 by inputting a preset passcode. The secure pages 3 and 4 are printed on both sides of another sheet (printed sheet 5), and pages 5 and 6 are printed on both sides of another sheet (printed sheet 6). Once the secure pages are printed, the user manually replaces the pre-defined labelled separator i.e., printed sheet 2 with the printed secure pages i.e., printed sheets 5 having content of page numbers 3 and 4 and 6 having content of page numbers 5 and 6. This way, the user manually rearranges the printed normal pages and printed secure pages to get a complete ordered printed document.

Similarly, the disclosure can be implemented for N-Up printing and one example is discussed for the sake of understanding. Here, the user submits a document having 8 pages, where the user wishes to securely print page numbers 3 and 5 and selects an option for N-up printing such as 4-up printing. In 4-up printing, multiple pages such as 4 pages of the document are printed on a single media sheet, where each page represents a logical page corresponding to the physical page. Here, the user selects automatic compilation method. Upon selection, the user submits the document for printing and compilation at a multi-function device. Here, the multi-function device first performs mapping of each physical page with a logical page to be printed on a media sheet. The multi-function device defines or creates a logical cell such that each logical page can fit in. Then, the multi-function device may resize pages such that 4 pages can be fit on a media sheet. Here, the multi-function device first prints page 1, 2 and 4 on logical cells defined on a first media sheet and leaves blank space for printing logical page 3 on the first media sheet i.e., on logical cell 3. The multi-function device then prints page 6, 7 and 8 on logical cells defined on a second media sheet and leaves space for later printing secure page 5 on the second media sheet i.e., on logical cell 5. The user then inputs the printed sheet 1 and 2 in a pre-defined tray and initiates printing of secure pages by inputting his passcode. The multi-function device picks up printed sheet 1 and identifies that logical cell 3 is empty where content of page 3 needs to be printed. The multi-function device prints page 3 content on the logical cell 3. Similarly, the multi-function device picks up printed sheet 2 and identifies that logical cell 5 is empty where page $5^{th}$ content needs to be fit in and prints content of page 5 on the logical cell 5 without printing any content on logical cells 6, 7 and 8. This way, the n-up printing can be completed at the multi-function device.

While the disclosure is implemented using a system including both the computing device and the multi-function device, it should be understood that the disclosure can be implemented using the multi-function device alone. In such scenario, the option for selecting one or more secure pages and the option to rearrange the normal and secure pages during/after printing is provided via a user interface of the multi-function device. To accomplish this, the user directly accesses the document to be printed at the multi-function device. For example, the user may access a cloud location at the multi-function device to download the document or may plug in an external device such as a USB drive, a hard drive, etc. to access the document. Subsequently, the user provides input to select the one or more pages of the document that are to be tagged as secure pages, while the remaining pages are tagged as normal pages. Then, the document is submitted at the multi-function device for printing. The multi-function device then performs further steps as discussed above to print the document and rearrange the printed secure and normal pages to get a printed document having all the pages arranged in order.

While not discussed explicitly, the present disclosure also provides an option to finish an output printed document, where the output document is obtained after rearrangement/compilation of the normal and secure pages in order. The finishing option includes various option such as punching, stapling, binding, etc. of the output printed document.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as tagging, submitting, receiving, identifying, sending, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for securing one or more individual pages of a document, the method is implemented at a multi-function device, the method comprising:
    receiving a print job from a user, comprising tagging of one or more pages to be printed as secure pages and remaining pages as normal pages;
    based on the tagging, separating the one or more secure pages and the normal pages;
    printing the normal pages without requiring any authentication information;
    printing the one or more secure pages upon receiving an authentication information from the user; and
    rearranging the printed one or more secure pages and the printed normal pages based on an input from the user, resulting in a complete ordered printed document.

2. The method of claim 1, wherein the input comprises selection of a manual method or an automated method to rearrange the printed one or more secure pages and the printed normal pages.

3. The method of claim 2, further comprising, if the user selects the manual method, placing one or more pre-defined labelled separator sheets between the printed normal pages as applicable for later insertion of the printed one or more secure pages in place of the one or more pre-defined labelled separator sheets.

4. The method of claim 2, further comprising, if the user selects the manual method, printing the one or more secure pages with one or more matching instructions for manual insertion of the printed one or more normal pages with the printed one or more secure pages.

5. The method of claim 2, further comprising, if the user selects the automated method, requesting the user to place the printed normal pages in a pre-defined tray.

6. The method of claim 5, further comprising, receiving input on the pre-defined tray comprising the printed normal pages.

7. The method of claim 5, further comprising, automatically picking the printed normal pages from the pre-defined tray as applicable for insertion in between the one or more secure pages to be printed.

8. The method of claim 1, further comprising, identifying the one or more secure pages and the normal pages, based on the tagging.

9. A method for handling a document comprising a combination of pages, the method comprising:
    receiving a print command from a user for printing the document, wherein the document comprises a combination of one or more pages to be secured and one or more normal pages, wherein the pages are in a pre-defined order;
    providing a user interface to the user:
        having an option to provide an input on one or more pages to be secured; and
        having an option to provide an input on the arrangement of the one or more secure and normal pages;
    upon receiving the inputs, sending the document and the received inputs for printing to a multi-function device;
    based on the received inputs, identifying the one or more secure pages and normal pages from the document;
    based on the identification, printing the normal pages of the document till completion;
    initiating printing of the identified one or more secure pages of the document, upon receiving an authentication information from the user; and
    based on the input on the arrangement of the one or more secure pages and normal pages, executing one or more instructions to rearrange the printed one or more secure pages and the printed normal pages to have an ordered printed document.

10. The method of claim 9, wherein the input on the one or more pages to be secured comprises at least one of: page numbers, page ranges, and one or more keywords.

11. The method of claim 9, further comprising, tagging the one or more pages to be secured based on the input from the user.

12. The method of claim 9, wherein the input on the arrangement of the one or more secure pages and normal pages comprises one of: selection of a manual method and an automated method.

13. The method of claim 12, further comprising, if the user selects the manual method, placing one or more pre-defined labelled separator sheets between the printed normal pages.

14. The method of claim 12, further comprising, if the user selects the manual method, printing the one or more secure pages with one or more matching instructions for manual insertion of the printed one or more secure pages between the printed normal pages.

15. The method of claim 12, further comprising, if the user selects the automated method, requesting the user to place the printed normal pages in a pre-defined tray.

16. The method of claim 15, further comprising, automatically picking the printed normal pages from the pre-defined tray and passes through a printer path without printing, into an output tray.

17. A system for handling a document comprising a combination of pages, the system comprising:
a print driver running on a computing device for:
receiving a print command from a user for printing a document, wherein the document comprises a combination of pages to be secured and normal pages;
providing a user interface:
including an option to provide an input on one or more pages to be secured; and
including an option to provide an input on the arrangement of the one or more pages to be secured and normal pages;
upon receiving the inputs, sending the document and the received inputs for printing to a multi-function device; and
the multi-function device is for:
based on the received inputs, identifying the one or more secure pages and normal pages from the document;
initiating printing of the normal pages of the document;
initiating printing of the identified one or more secure pages of the document based on an authentication information from the user; and
based on the input on the arrangement of the one or more pages to be secured and normal pages, rearranging the pages such that the combined printed pages are in order.

18. The system of claim 17, wherein the input on the one or more pages to be secured comprises at least one of: page numbers, page ranges, and keywords.

19. The system of claim 17, wherein the print driver is for tagging the one or more pages to be secured.

20. The system of claim 17, wherein the input on the arrangement of the one or more secure pages and normal pages comprises one of: selection of a manual method and an automated method.

21. The system of claim 20, wherein the multi-function device is for, if the user selects the manual method, placing one or more pre-defined labelled separator sheets between the printed normal pages.

22. The system of claim 20, wherein the multi-function device is for, if the user selects the manual method, printing the one or more pages to be secured with one or more matching instructions for manual insertion of the printed one or more secure pages with the printed normal pages.

23. The system of claim 20, wherein the multi-function device is for, if the user selects the automated method, requesting the user to place the printed normal pages in a pre-defined tray.

24. The system of claim 23, wherein the multi-function device is for, automatically picking the printed normal pages from the pre-defined tray and passes through a printer path without printing, into an output tray.

25. A multi-function device for securing one or more individual pages of a document, the multi-function device is for:
receiving a print job from a user, comprising tagging of one or more pages to be secured and remaining pages as normal pages;
based on the tagging, separating the one or more pages to be secured from the normal pages:
printing the normal pages without requiring any authentication information;
printing the one or more pages to be secured, upon receiving an authentication information from the user; and
rearranging the printed one or more secure pages and the printed normal pages based on an input from the user, resulting in a complete ordered print job.

26. The multi-function device of claim 25, wherein the input comprises selection of a manual method or an automated method to arrange the printed one or more secure pages and the printed normal pages.

27. The multi-function device of claim 26 is for, if the user selects the manual method, placing one or more pre-defined labelled separator sheets between the printed normal pages.

28. The multi-function device of claim 26 is for, if the user selects the manual method, printing the one or more secure pages with one or more matching instructions for manual insertion of the printed one or more secure pages with the printed normal pages.

29. The multi-function device of claim 26 is for, if the user selects the automated method, requesting the user to place the printed normal pages in a pre-defined tray.

30. The multi-function device of claim 29 is for, receiving input on the pre-defined tray comprising the printed normal pages.

31. The multi-function device of claim 29 is for, automatically picking the printed normal pages from the pre-defined tray as applicable for inserting into the one or more secure pages to be printed.

* * * * *